United States Patent
Hasegawa

(10) Patent No.: US 10,475,475 B2
(45) Date of Patent: Nov. 12, 2019

(54) DISK APPARATUS AND DUAL ACTUATOR ASSEMBLY HAVING A WIRING BOARD WITH A BENT CONNECTION PORTION

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hisashi Hasegawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/119,247

(22) Filed: Aug. 31, 2018

(65) Prior Publication Data

US 2019/0287558 A1 Sep. 19, 2019

(30) Foreign Application Priority Data

Mar. 19, 2018 (JP) ................................ 2018-051513

(51) Int. Cl.
*G11B 5/48* (2006.01)
*G11B 5/55* (2006.01)

(52) U.S. Cl.
CPC ............ *G11B 5/4846* (2013.01); *G11B 5/486* (2013.01); *G11B 5/4813* (2013.01); *G11B 5/4886* (2013.01); *G11B 5/5578* (2013.01)

(58) Field of Classification Search
None
See application file for complete search history.

(56) References Cited

U.S. PATENT DOCUMENTS

| | | | | |
|---|---|---|---|---|
| 5,761,007 A * | 6/1998 | Price et al. | .......... | G11B 5/4813 360/264.4 |
| 6,449,130 B1 * | 9/2002 | Koyama | .............. | G11B 5/4813 360/264.4 |
| 6,560,075 B2 * | 5/2003 | Price et al. | .......... | G11B 5/4813 360/246.7 |
| 8,717,703 B2 | 5/2014 | Matsuzawa et al. | | |
| 10,192,575 B1 * | 1/2019 | Resh | .................... | G11B 5/4813 |

FOREIGN PATENT DOCUMENTS

| | | |
|---|---|---|
| JP | H07-130136 A | 5/1995 |
| JP | 2003-187540 A | 7/2003 |

* cited by examiner

*Primary Examiner* — Craig A. Renner
(74) *Attorney, Agent, or Firm* — Kim & Stewart LLP

(57) ABSTRACT

A disk apparatus includes recording disks and a first and a second actuator assembly that rotate about a support shaft and that each include: an actuator block; a wiring board having connection terminals and installed on an installation surface of the actuator block; and head assemblies each attached to the actuator block via an arm and each including a head and an interconnection member. The wiring board of each of the first and the second actuator assembly has a connection portion connected to one of the connection terminals and located adjacently to a boundary between the first and the second actuator assembly, and the connection portion of the first or the second actuator assembly is bent with respect to the installation surface.

20 Claims, 10 Drawing Sheets

DISK APPARATUS AND DUAL ACTUATOR ASSEMBLY HAVING A WIRING BOARD WITH A BENT CONNECTION PORTION

CROSS-REFERENCE TO RELATED APPLICATION

This application is based upon and claims the benefit of priority from Japanese Patent Application No. 2018-051513, filed on Mar. 19, 2018, the entire contents of which are incorporated herein by reference.

FIELD

Embodiments described herein relate generally to a disk apparatus having actuator assemblies and a dual actuator assembly.

BACKGROUND

In general, a disk apparatus such as a hard disk drive (HDD) includes: magnetic disks within a casing, a spindle motor that supports the magnetic disks and rotates the magnetic disks, an actuator assembly that supports magnetic heads, a voice coil motor that drives this actuator assembly, a flexible printed circuit board unit for controlling these components, and the like.

The actuator assembly has an actuator block supported rotatably about a support shaft and a plurality of head gimbal assemblies (hereinafter, referred to as "HGAs") supported by the actuator block via arms. The HGAs each include a suspension and a load beam, a flexure (an interconnection member) attached onto the load beam, and the magnetic head mounted on a gimbal portion of the flexure. Furthermore, the flexure has a connection end portion extending up to the actuator block, and this connection end portion is electrically joined to a flexible wiring board (FPC) attached to the actuator block.

The number of magnetic disks installed in the casing is on the increase these days with an increase in a memory capacity of the HDD. A so-called dual actuator assembly having two stacked actuator assemblies is proposed to handle a plurality of magnetic disks. When the plurality of magnetic disks is stacked, a gap between the two adjacent HGAs in each actuator assembly is normally approximately 0.15 mm. Because of this, when the two actuator assemblies are superimposed one above the other, it is also necessary to seta gap in a boundary between the actuator assemblies to approximately 0.15 mm.

However, the two actuator assemblies operate to rotate independently of each other. For this reason, a spacing of approximately 0.15 mm between the actuator assemblies is insufficient for ensuring smooth operation without interference with each other. A technique for reducing the number of magnetic heads or magnetic disks in a boundary portion or a technique for extending a stacking gap between magnetic disks have been proposed to ensure the sufficient spacing; however, a memory capacity of an entire disk apparatus decreases in either case.

DETAILED DESCRIPTION

An embodiment provides a disk apparatus capable of providing a plurality of actuator assemblies without reducing a memory capacity.

In general, according to one embodiment, a disk apparatus includes a plurality of recording disks; and a first and a second actuator assembly that rotate about a support shaft and that each include: a rotatable actuator block; a wiring board having a plurality of connection terminals and installed on an installation surface of the actuator block; and a plurality of head gimbal assemblies each attached to the actuator block via an arm and each including a head that reads or writes information from or to a corresponding recording disk of the recording disks, and an interconnection member having a tip end portion connected to the head and a connection end portion connected to a corresponding connection terminal of the connection terminals.

The wiring board of each of the first and the second actuator assembly has a connection portion connected to one of the connection terminals and located adjacently to a boundary between the actuator blocks of the first and the second actuator assembly, and either the connection portion of the first actuator assembly or the connection portion of the second actuator assembly is bent with respect to the installation surface Disk apparatuses according to embodiments will be described hereinafter with reference to the drawings.

It is noted that the disclosure is presented by way of example only and matters which can be changed as appropriate without departing from the spirit of the disclosure and which could easily be conceived of fall within the scope of the present disclosure. Moreover, the drawings are often depicted schematically in widths, thicknesses, shapes, and the like of portions, compared with actual aspects for making clearer descriptions. However, the drawings are presented by way of example only and do not limit the reading of the present disclosure. Furthermore, in the present specification and the drawings, similar elements to those already described with reference to the drawings already described are denoted by the same reference signs and detailed descriptions thereof are often omitted as appropriate.

First Embodiment

A hard disk drive (HDD) according to a first embodiment will be described in detail as a disk apparatus.

Figure 1:
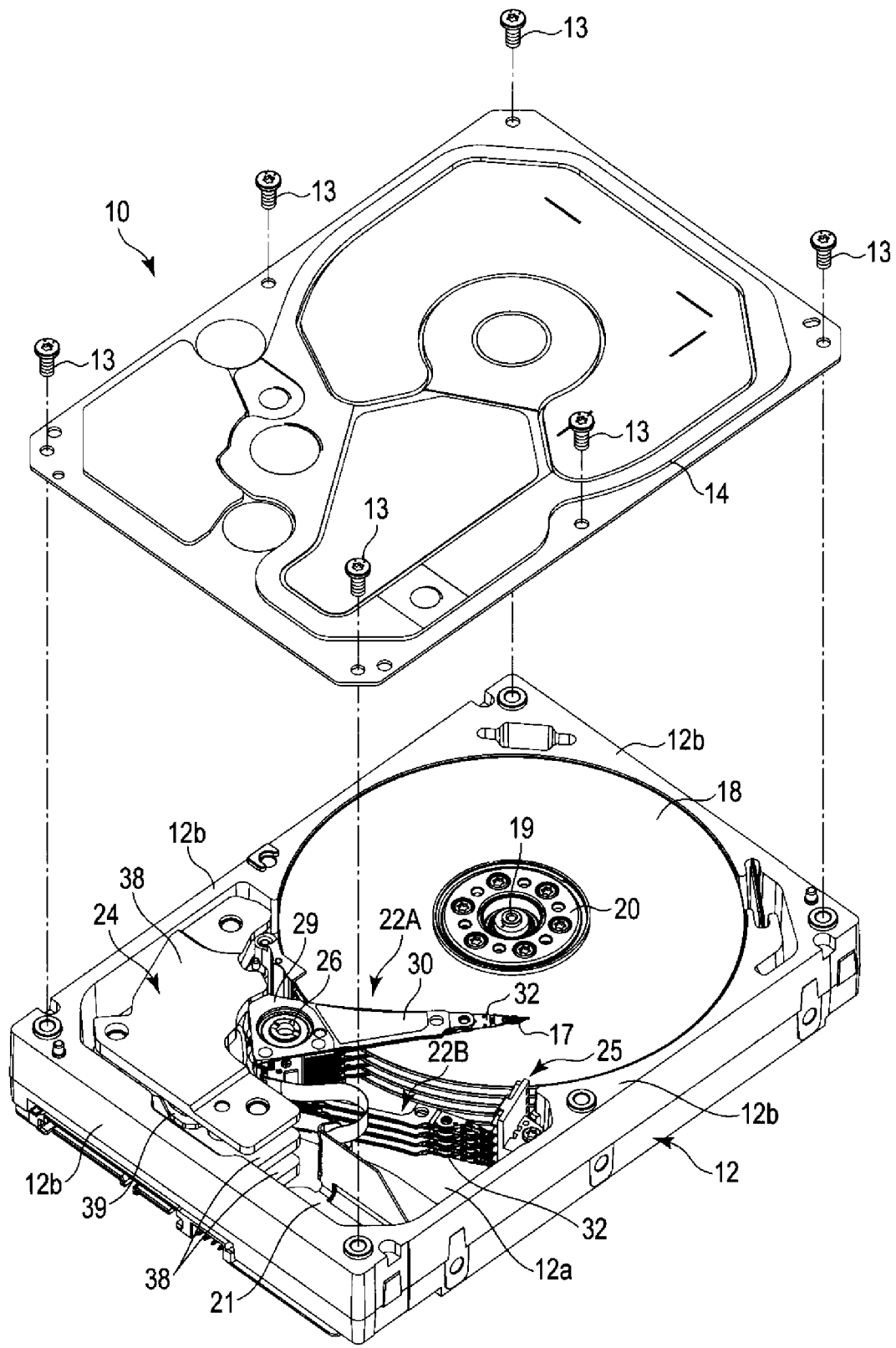
FIG. 1 is an exploded perspective view illustrating a hard disk drive (HDD) according to a first embodiment with a top cover disassembled.

FIG. 1 is an exploded perspective view of the HDD according to the first embodiment with a top cover detached.

The HDD includes a flat, generally rectangular casing 10. This casing 10 has a rectangular box-like base 12 having an open upper surface and a top cover 14. The top cover 14 is screwed on the base 12 by a plurality of screws 13 and blocks an upper end opening of the base 12. The base 12 has a rectangular bottom wall 12a opposed to the top cover 14 with a gap kept therebetween and a side wall 12b built along a periphery of the bottom wall, and the bottom wall 12a and the side wall 12b are formed integrally out of, for example, aluminum. The top cover 14 is formed out of, for example, stainless steel into a rectangular plate shape. The top cover 14 is screwed on the side wall 12b of the base 12 and blocks the upper opening of the base 12.

A plurality of magnetic disks 18 serving as recording mediums and a spindle motor 19 serving as a drive unit that supports and rotates the magnetic disks 18 are provided within the casing 10. The spindle motor 19 is provided on the bottom wall 12a. Each magnetic disk 18 is formed to have a diameter of, for example, 88.9 mm (3.5 inches) and has a magnetic recording layer on each of or one of upper and lower surfaces thereof. The magnetic disks 18 are fitted into a hub, not shown, of the spindle motor 19 coaxially with one another and clamped by a clamp spring 20 to be fixed to the hub. The plurality of magnetic disks 18 is stacked in parallel to one another at a predetermined spacing between the adjacent magnetic disks 18. Furthermore, the magnetic disks 18 are supported in a state of being located in parallel to the bottom wall 12a of the base 12. The plurality of magnetic disks 18 are rotated at a predetermined revolving speed by the spindle motor 19.

While the present embodiment indicates an example in which seven magnetic disks 18 are disposed within the casing 10 as shown in FIG. 1, the number of magnetic disks 18 is not limited to seven.

The casing 10 accommodates a plurality of magnetic heads 17 for reading and writing information to and from the magnetic disks 18 and a head actuator assembly supporting these magnetic heads 17 to be movable relatively to the magnetic disks 18. In an embodiment, the head actuator assembly is configured as a dual actuator assembly including a plurality of actuator assemblies, for example, a first actuator assembly 22A and a second actuator assembly 22B. The first and second actuator assemblies 22A and 22B are supported rotatably about a common support shaft (pivot) 26.

Furthermore, voice coil motors (VCMs) 24 that rotate and position the first and second actuator assemblies 22A and 22B, a ramp load mechanism 25 that holds any magnetic head 17 at an unloaded position apart from the corresponding magnetic disk 18 when the magnetic head 17 moves to an outermost circumference of the magnetic disk 18, and a board unit (FPC unit) 21 in which electronic components such as a conversion connector are mounted are provided within the casing 10.

A printed circuit board, not shown, is screwed on an outer surface of the bottom wall 12a. The printed circuit board configures a control unit, and this control unit controls the spindle motor 19 to operate and also controls the VCMs 24 and the magnetic heads 17 to operate via the board unit 21.

Figure 2:
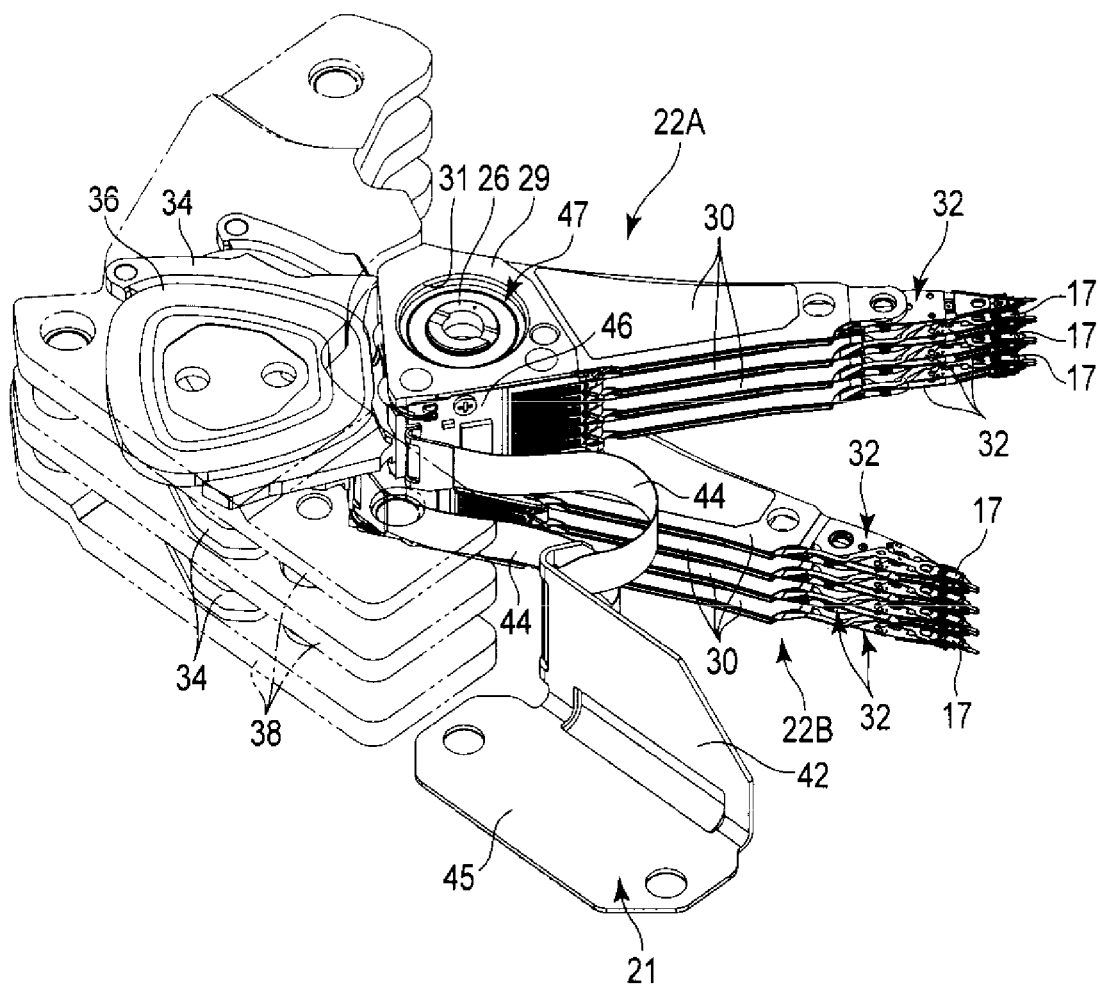
FIG. 2 is a perspective view illustrating actuator assemblies and a board unit of the HDD.
Figure 3:
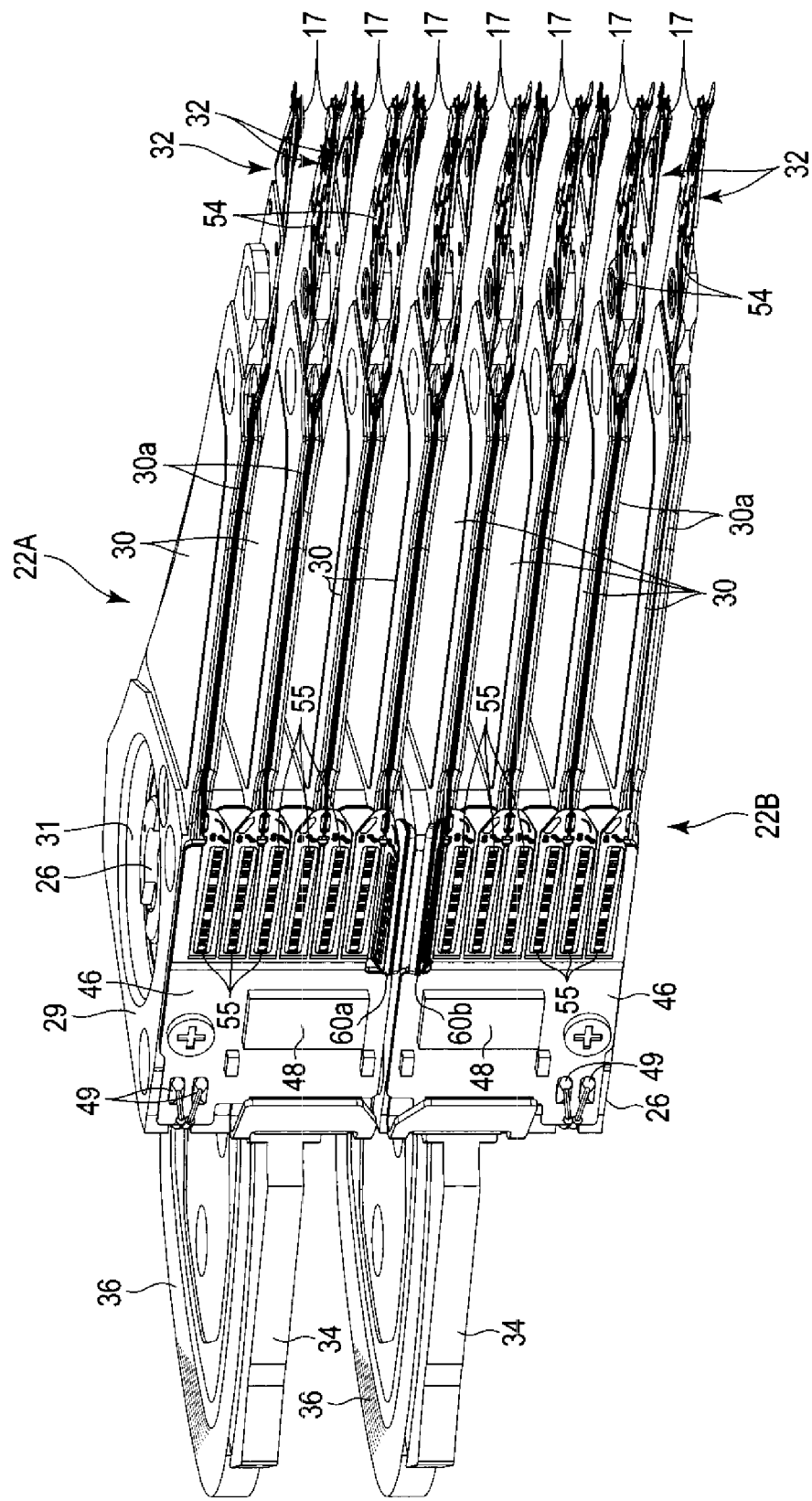
FIG. 3 is a perspective view of the actuator assemblies in an aligned state.
Figure 4:
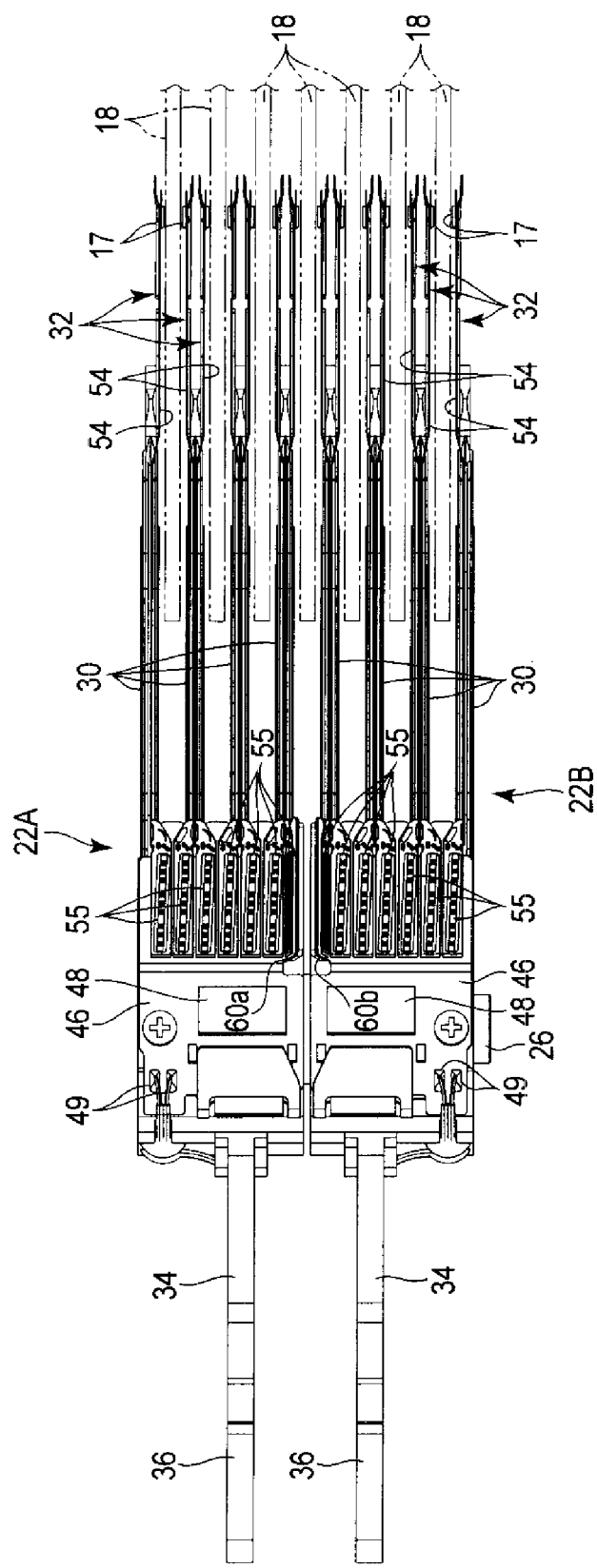
FIG. 4 is a side view of the actuator assemblies.

FIG. 2 is a perspective view illustrating the head actuator assembly having the dual actuator assembly and the FPC unit, FIG. 3 is a perspective view of the dual actuator assembly in an aligned state, and FIG. 4 is a side view of the dual actuator assembly in an aligned state. As shown in FIGS. 2 and 3, the dual actuator assemblies include the first actuator assembly 22A and the second actuator assembly 22B. The first and second actuator assemblies 22A and 22B are superimposed one above the other, and are provided to be rotatable about the common support shaft 26 built on the bottom wall 12a of the base 12 independently of each other. The first actuator assembly 22A and the second actuator assembly 22B are substantially identical in structure. As an example, the actuator assembly on the upper side is assigned as the first actuator assembly 22A and the actuator assembly on the lower side is assigned as the second actuator assembly 22B.

The first actuator assembly 22A includes an actuator block (first actuator block) 29, four arms 30 extending from the actuator block 29, head gimbal assemblies (HGAs, often referred to as "suspension assemblies") 32 attached to the respective arms 30, and the magnetic heads 17 supported by the HGAs 32. The actuator block 29 has an inner hole 31, and a bearing unit (unit bearing) 47 is accommodated in this inner hole 31. The actuator block 29 is supported by the bearing unit 47 to be rotatable about the support shaft 26.

In an embodiment, the actuator block 29 and the four arms 30 are formed integrally out of aluminum or the like and configure a so-called E block. The arms 30 are each formed into, for example, a long and thin plate shape and extend from the actuator block 29 in a direction orthogonal to the support shaft 26. The four arms 30 are provided in parallel at a gap kept between the adjacent arms 30.

The first actuator assembly 22A has a support frame 34 extending from the actuator block 29 in a direction opposite to the arms 30. A voice coil 36 is supported by the support frame 34. As shown in FIGS. 1 and 2, the voice coil 36 is located between a pair of yokes 38 installed on the base 12, and the VCM 24 comprises the voice coil 36, these yokes 38, and a magnet 39 fixed to any of the yokes 38.

As shown in FIGS. 3 and 4, the first actuator assembly 22A includes seven HGAs 32, and these HGAs 32 are attached to extension ends of the arms 30. The plurality of HGAs 32 include upward-head HGAs each supporting the magnetic heads 17 upward and downward-head HGAs supporting the magnetic head 17 downward. The upward-head HGAs and the downward-head HGAs are configured such that the HGAs 32 having an identical structure are arranged in different directions, i.e., upward and downward directions. In an embodiment, one downward-head HGA 32 is attached to the uppermost arm 30 and the two HGAs that are one upward-head HGA 32 and one downward-head HGA 32 are attached to each of the three other arms 30 in the first actuator assembly 22A.

The seven HGAs 32 extend from the four arms 30 and are arranged generally in parallel to one another at a predetermined spacing between the adjacent HGAs 32. A pair of magnetic heads 17 supported by the three downward-head HGAs 32 other than the lowermost downward-head HGA 32 and the upward-head HGAs 32 are located to face each other at a predetermined spacing therebetween. These magnetic heads 17 are located opposed to both surfaces of the corresponding magnetic disk 18. The magnetic head 17 corresponding to the lowermost downward-head HGA 32 is located opposed to the upper surface of the magnetic disk 18 that is disposed between this magnetic head 17 and the magnetic head 17 supported by the uppermost upward-head HGA 32 in the second actuator assembly 22B to be described later.

Figure 5:
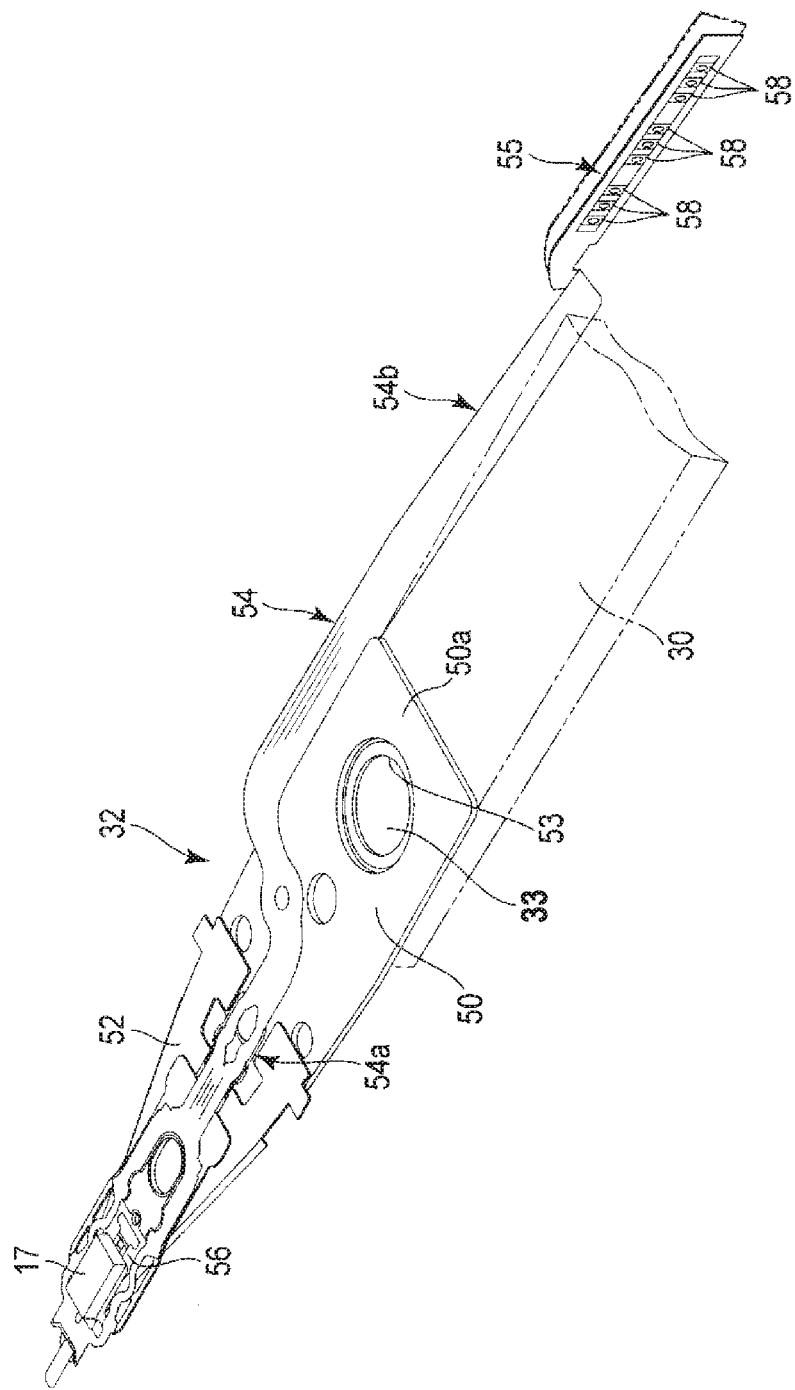
FIG. 5 is a perspective view illustrating an upward-head HGA in the actuator assemblies.
Figure 6:
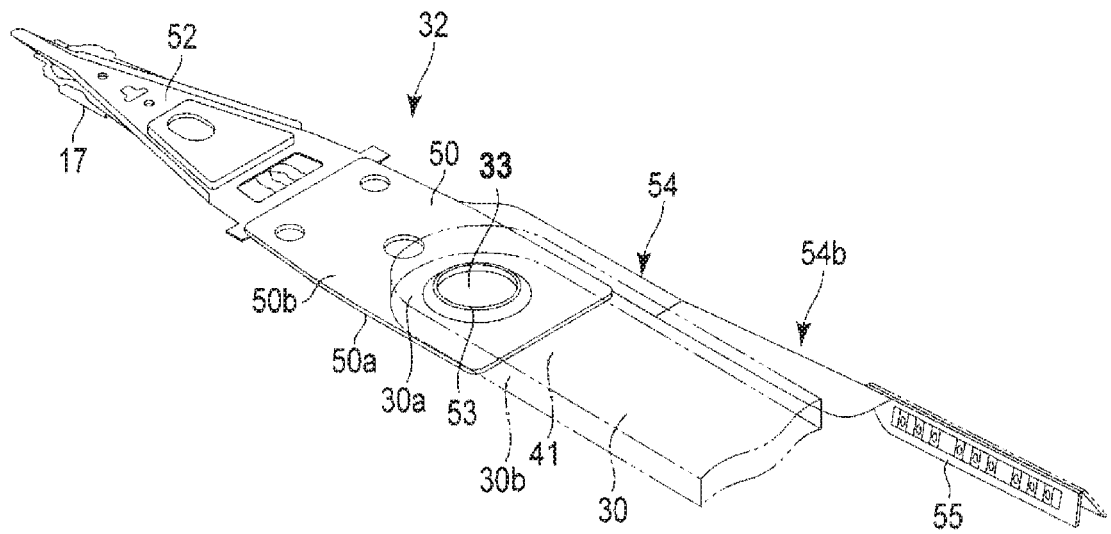
FIG. 6 is a perspective view illustrating a downward-head HGA in the actuator assemblies.

FIG. 5 is a perspective view illustrating the upward-head HGA and FIG. 6 is a perspective view illustrating the downward-head HGA. As shown, the HGA 32 has a generally rectangular base plate 50, a long and thin plate spring-like load beam 52, and a long and thin strip-like flexure (interconnection member) 54. The load beam 52 has a base end portion that is fixed to and superimposed on an end portion of the base plate 50. The load beam 52 extends from the base plate 50 and is formed tapered toward an extension end. The base plate 50 and the load beam 52 are formed out of, for example, stainless steel. As an example, the base plate 50 is formed to have a thickness of approximately 150 μm and the load beam 52 is formed to have a thickness of approximately 25 to 30 μm.

The base plate 50 has a first surface 50a and a second surface 50b that is a fixed surface opposite to the first surface 50a. The base plate 50 has a circular opening and an annular projection portion 53 located around this opening, which are provided in a base end portion thereof. The projection portion 53 protrudes from the second surface 50b of the base plate 50. A base end portion side of the base plate 50 is superimposed on a bearing surface 41 of a tip end portion 30b of the arm 30. The projection portion 53 of the base plate 50 is fitted into the caulking hole 33 formed in the arm 30 and this projection portion 53 is caulked, thereby fastening the base plate 50 to the tip end portion 30b of the arm 30.

A base end portion of the load beam 52 is superimposed on a tip end portion of the base plate 50 and welded in a plurality of locations, thereby fixing the base end portion of the load beam 52 to the base plate 50.

The flexure 54 of the HGA 32 has a metal plate (backing layer) serving as a base and made of stainless steel or the like, an insulating layer formed on this metal layer, a conductive layer that configures a plurality of interconnections (an interconnection pattern) formed on the insulating layer, and a cover layer (a protection layer, an insulating layer) that covers the conductive layer, and form a long and thin strip-like plate to be stacked. The flexure 54 has a tip end side portion 54a and a base end side portion 54b. The tip end side portion 54a is attached onto the load beam 52 and the first surface 52a of the base plate 50. The base end side portion 54b extends outward from a side edge of the base plate 50 and extends further to a base end portion of the arm 30 along the arm 30.

Part of the tip end side portion 54a forms a displaceable gimbal portion (elastic support portion 56). The gimbal portion 56 is located on the load beam 52. The magnetic head 17 is placed on the gimbal portion 56. The interconnections of the flexure 54 are electrically connected to a read element, a write element, a heater, and other members of the magnetic head 17.

The base end side portion 54b of the flexure 54 extends outward from the side edge of the base plate 50 and then extends to a base end of the arm 30 through a groove 30a (refer to FIG. 3) formed in a side edge of the arm 30. A connection end portion (tail connection terminal portion) 55 of the flexure 54 is formed on a tip end of the base end side portion 54b. The connection end portion 55 has a long and thin rectangular shape. The connection end portion 55 is bent generally at a right angle with respect to the base end side portion 54b and located generally perpendicularly to the arm 30. As described later, the connection end portion 55 near a boundary between the two actuator blocks is bent at an angle, for example, of 10 to 60 degrees different from the angle of the other connection end portions 55.

A plurality of, for example, nine connection terminals (connection pads) 58 are provided in the connection end portion 55. These connection terminals 58 are connected to the interconnections of the flexure 54, respectively. That is, the plurality of interconnections of the flexure 54 extends over an almost total length of the flexure 54, one end of each interconnection is electrically connected to the magnetic head 17, and the other end thereof is connected to one connection terminal 58 of the connection end portion 55.

As shown in FIGS. 3 and 4, seven connection end portions 55 are joined to a flexible printed wiring board (FPC) provided on an installation surface of the actuator block 29. The connection terminals 58 of each connection end portion 55 are joined to connection terminals of the FPC by soldering and electrically and mechanically joined to the FPC. The seven connection end portions 55 are aligned in an axial direction of the support shaft 26 and disposed adjacently in parallel to one another.

Meanwhile, the second actuator assembly 22B has a similar structure as the first actuator assembly 22A. That is, as shown in FIGS. 2, 3, and 4, the second actuator assembly 22B includes an actuator block (second actuator block) 29 having the bearing unit 47 built therein, four arms 30 extending from the actuator block 29, seven HGAs 32 attached to the arms 30, magnetic heads 17 placed on the respective HGAs, and a support frame 34 supporting a voice coil 36.

The actuator block 29 is supported to be rotatable about the support shaft 26 through the bearing unit 47. The actuator block (second actuator block) 29 is supported by a base end portion (bottom wall 12a-side half portion) of the support shaft 26 and disposed coaxially below the first actuator block 29. The actuator block (second actuator block) 29 is opposed to the first actuator block 29 at a small gap kept therebetween.

The upward-head HGA 32 is attached to the lowermost arm 30 and the two HGAs that are one upward-head HGA 32 and one downward-head HGA 32 are attached to each of the three other arms 30 in the second actuator assembly 22B. The voice coil 36 of the second actuator assembly 22B is located between a pair of yokes 38 installed on the base 12, and the VCM 24 comprises the voice coil 36, these yokes 38, and the magnet 39 fixed to any of the yokes 38.

The VCM 24 that drives the first actuator assembly 22A and the VCM 24 that drives the second actuator assembly 22B are provided independently of each other. The first actuator assembly 22A and the second actuator assembly 22B can be thereby driven (rotated) independently of each other.

As shown in FIG. 2, the FPC unit 21 integrally has a generally rectangular base portion 42, two long and thin strip-like relay portions 44 extending from one side edge of the base portion 42, and two joint portions (wiring boards) 46 provided continuously with tip ends of the respective relay portions 44. The base portion 42, the relay portions 44, and the joint portions 46 are formed by the flexible printed circuit board. The flexible printed circuit board has an insulating layer made of polyimide or the like, a conductive layer formed on this insulating layer and forming interconnections, connection pads, and the like, and a protection layer that covers the conductive layer.

Electronic components such as a conversion connector and a plurality of capacitors, not shown, are mounted on the base portion 42 and electrically connected to interconnections, not shown. A metal plate 45 that functions as a reinforcement plate is bonded to the base portion 42. The base portion 42 is installed on the bottom wall 12a of the base 12. The two relay portions 44 extend from a side edge of the base portion 42 toward the first and second actuator assemblies 22A and 22B. The joint portions 46 provided on extension ends of the relay portions 44 are each bonded to one side surface (installation surface) of each of the actuator blocks 29 via a backing plate, to be described later, and further fixedly screwed on the installation surface by a fixation screw.

As shown in FIGS. 3 and 4, the connection end portions 55 of the flexures 54 are joined to a plurality of connection portions of each joint portion 46 and electrically connected to interconnections of the joint portion 46. A head IC (head amplifier) 48 is mounted on each joint portion 46 and this head IC 48 is connected to the connection end portions 55 and the base portion 42 via the interconnections. Furthermore, the joint portion 46 has connection pads 49 to which the voice coil 36 is connected.

The seven magnetic heads 17 of the first actuator assembly 22A are each electrically connected to the base portion 42 through the interconnections of the flexure 54, the connection end portion 55, the joint portion 46 of the FPC unit 21, and the relay portion 44. Likewise, the seven magnetic heads 17 of the second actuator assembly 22B are each electrically connected to the base portion 42 through the interconnections of the flexure 54, the connection end portion 55, the joint portion 46 of the FPC unit 21, and the relay portion 44. Moreover, the base portion 42 is electrically connected to the printed circuit board on a bottom surface side of the casing 10 via the conversion connector.

Figure 7:
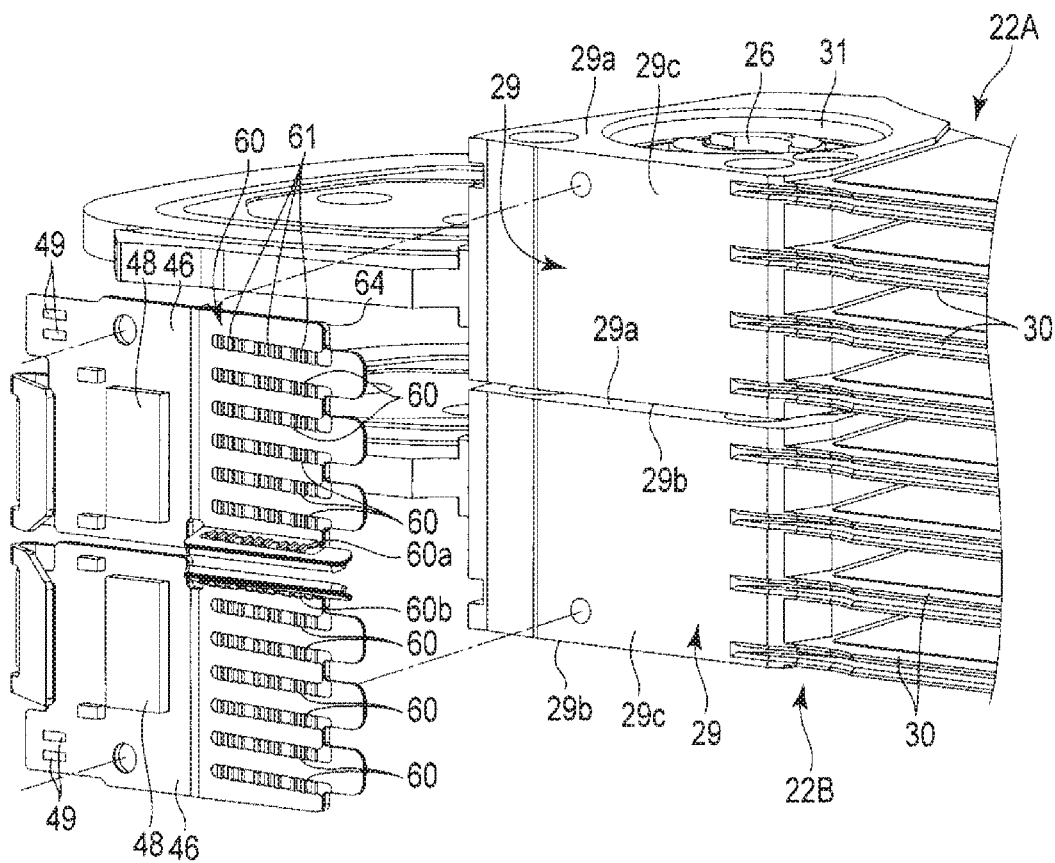
FIG. 7 is an exploded perspective view illustrating actuator blocks and FPC joint portions.
Figure 8:
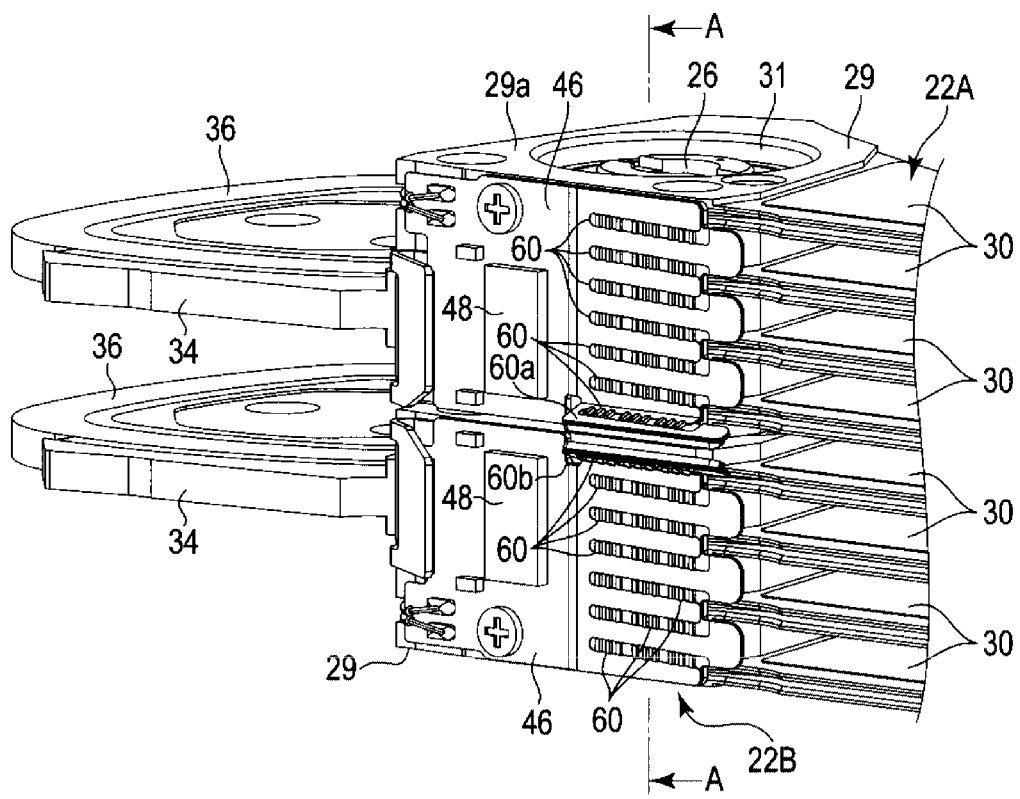
FIG. 8 is a perspective view illustrating actuator block portions in the actuator assemblies in a state in which connection end portions of the HGAs are not connected.
Figure 9:
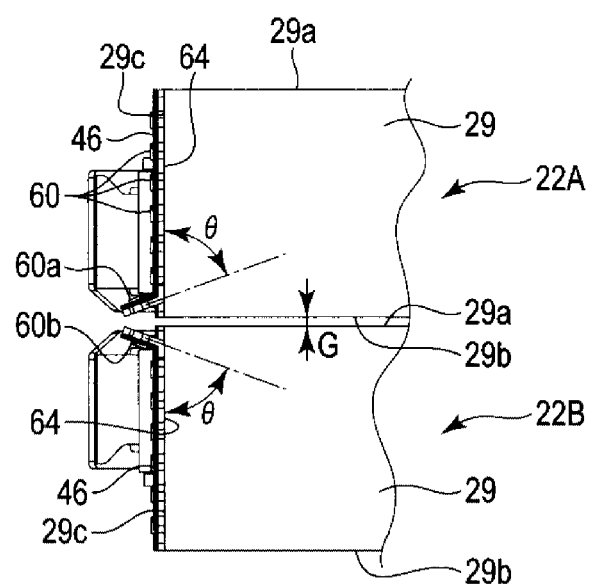
FIG. 9 is a schematic cross-sectional view, taken along a line A-A of FIG. 8, of the actuator block portions.

A configuration of the joint portion 46 and that of a boundary portion between the actuator blocks will next be described in detail. FIG. 7 is an exploded perspective view illustrating the actuator blocks and the joint portions, FIG. 8 is a perspective view illustrating actuator block portions in a state in which the HGAs are disconnected, and FIG. 9 is a schematic cross-sectional view taken along a line A-A of FIG. 8 and illustrating the actuator blocks and the joint portions. It is noted that FIGS. 7 to 9 do not illustrate the relay portions 44 of the FPC unit 21.

As shown in FIGS. 7 and 8, the actuator block (first actuator block) 29 of the first actuator assembly 22A has an upper end surface 29a and a lower end surface 29b orthogonal to the support shaft 26, and a flat side surface (installation surface) 29c extending in parallel to the support shaft 26. Likewise, the actuator block (second actuator block) 29 of the second actuator assembly 22B has an upper end surface 29a and a lower end surface 29b orthogonal to the support shaft 26, and a flat side surface (installation surface) 29c extending in parallel to the support shaft 26. The lower end surface 29b of the first actuator block 29 and the upper end surface 29a of the second actuator block 29 are opposed to each other with a small gap kept therebetween.

Each of the joint portions 46 of the FPC unit 21 is formed into a rectangular shape almost identical to the installation surface 29c in magnitude. A backing plate 64 made of, for example, aluminum is bonded to a rear surface of each joint portion 46 as a reinforcement plate. The backing plate 64 is formed to be generally identical to each joint portion 46 in magnitude and shape. Each joint portion 46 is bonded to and screwed on the installation surface 29c of the actuator block 29 via the backing plate 64. An upper side edge of the joint portion 46 is located to be aligned with an upper side edge of the installation surface 29c; likewise, a lower side edge of the joint portion 46 is located to be aligned with a lower side edge of the installation surface 29c.

Each joint portion 46 has seven connection pad groups 60 corresponding to the connection end portions 55 of the HGAs 32. Each connection pad group 60 has, for example, nine connection pads 61 aligned in a line. Each connection pad 61 is electrically connected to the base portion 42 via the interconnections of the FPC. Each connection pad group 60 extends in a direction generally orthogonal to the support shaft 26, that is, in a direction generally parallel to the upper side edge and the lower side edge of the joint portion 46. In addition, the seven connection pad groups 60 are aligned in the axial direction of the support shaft 26 at a spacing between the adjacent connection pad groups 60.

In the joint portion (first wiring board) 46 of the first actuator assembly 22A, a rectangular lower end connection portion (first connection portion) 60a, in which the lowermost connection pad group, that is, the connection pad group 60 located near the lower side edge of the joint portion 46 (near the boundary between the first actuator block and the second actuator block) among the plurality of connection pad groups 60 is provided, is cut and raised, that is, bent together with a corresponding part of the backing plate 64 in a direction of separating from the support shaft 26 or the installation surface 29c. As shown in FIG. 9, the lower end connection portion 60a is inclined outward at an angle θ (for example, 30 to 80 degrees) with respect to a surface of the joint portion 46. The lower end connection portion 60a is thereby provided at the angle different from that of the other connection portions on the joint portion 46. In the above and following descriptions, "be bent" includes a state in which an object is bent and is not limited to a state in which a straight object is turned into a bent state by bending the object. In other words, "be bent" includes a configuration such that an object is formed in a bent state in advance.

As shown in FIGS. 7 and 8, in the joint portion (second wiring board) 46 of the second actuator assembly 22B, a rectangular upper end connection portion (second connection portion) 60b, in which the uppermost connection pad group, that is, the connection pad group 60 located near the upper side edge of the joint portion 46 (near the boundary between the first actuator block and the second actuator block) among the plurality of connection pad groups 60 is provided, is cut and raised, that is, bent together with a corresponding part of the backing plate 64 in the direction of separating from the support shaft 26 or the installation surface 29c. As shown in FIG. 9, the upper end connection portion 60b is inclined at the angle θ (for example, 30 to 80 degrees) with respect to the surface of the joint portion 46. The upper end connection portion 60b is thereby provided at the angle different from that of the other connection portions on the joint portion 46.

As shown in FIGS. 8 and 9, the lower end connection portion 60a and the upper end connection portion 60b are opposed to each other with a gap kept therebetween without interference with each other in a state in which the joint portions 46 are fixed to the installation surface 29c of the first actuator block and the installation surface 29c of the second actuator block 29, respectively. The lower end connection portion 60a and the upper end connection portion 60b are each bent in the direction of separating from the installation surface 29c; thus, even if a gap G between the first and second actuator blocks 29 is set narrow, it is possible to sufficiently secure a spacing between the lower end connection portion 60a and the upper end connection portion 60b.

As shown in FIGS. 3 and 4, the connection end portions 55 of the plurality of flexures 54 are superimposed on the corresponding connection portions (connection pad groups) on the joint portions 46. The plurality of connection terminals 58 of the connection end portions 55 are electrically and mechanically joined to the corresponding connection pad groups 60 by, for example, soldering. In the first actuator assembly 22A, the lowermost connection end portion 55 is superimposed on the lower end connection portion 60a on the joint portion 46 and joined to the connection pad group 60. The lowermost connection end portion 55 is thereby disposed, together with the lower end connection portion 60a, in a state of being bent in the direction of separating from the installation surface 29c.

In the second actuator assembly 22B, the uppermost connection end portion 55 is superimposed on the upper end connection portion 60b on the joint portion 46 and joined to the connection pad group 60. The uppermost connection end portion 55 is disposed in a state of being bent in the direction of separating from the installation surface 29c along the upper end connection portion 60b.

According to the dual actuator assembly configured as described above, in the boundary portion between the first actuator assembly 22A and the second actuator assembly 22B, the lower end connection portion 60a and the connection end portion 55 are disposed and bent in the direction of separating from the support shaft 26 or the installation surface 29c. Owing to this, even if the first actuator block 29 and the second actuator block 29 are disposed to be close to each other, the sufficient gap can be secured therebetween without interference between the lower end connection portion 60a and the upper end connection portion 60b. It is thereby possible to set narrow the gap G between the first actuator block 29 and the second actuator block 29, and it is unnecessary to extend a stacking spacing between the magnetic disks corresponding to the boundary between the first actuator assembly 22A and the second actuator assembly 22B.

As shown in FIG. 1, the support shaft 26 is fixed to the bottom wall 12a and built generally in parallel to a spindle of the spindle motor 19 in a state of incorporating the head actuator assemblies into the casing 10. Each magnetic disk 18 is located between the two HGAs 32. When the HDD is in operation, the first actuator assembly 22A and the second actuator assembly 22B are rotated about the support shaft 26 either independently of each other or integrally. The magnetic heads 17 supported by the HGAs 32 are opposed to the upper surface and the lower surface of the magnetic disk 18, respectively. The base portion 42 of the FPC unit 21 is fixed to the bottom wall 12a.

According to the HDD and the actuator assemblies configured as described so far, despite the configuration such that the plurality of actuator assemblies that can be driven independently are superimposed one above the other, it is possible to set the spacing between the actuator assemblies to a desired spacing without reducing the number of magnetic heads or the magnetic disks in the boundary portion. It is thereby possible to obtain the disk apparatus capable of providing a plurality of actuator assemblies without reducing a storage capacity.

While the disk apparatus is configured such that both the lower end connection portion 60a on the FPC joint portion 46 in the first actuator assembly and the upper end connection portion 60b on the FPC joint portion 46 in the second actuator assembly are bent in the first embodiment, the configuration of the disk apparatus is not limited to this configuration. Alternatively, the disk apparatus may be configured such that only one of the lower end connection portion 60a and the upper end connection portion 60b is bent. Even in this alternative, it is possible to set narrow the gap between the actuator blocks.

Interconnection members of an HDD according to another embodiment will next be described. In another embodiment described below, the same parts as those in the abovementioned first embodiment are denoted by the same reference signs and detailed descriptions thereof will be either omitted or simplified, and parts different from those in the first embodiment will be mainly described.

Second Embodiment

Figure 10:
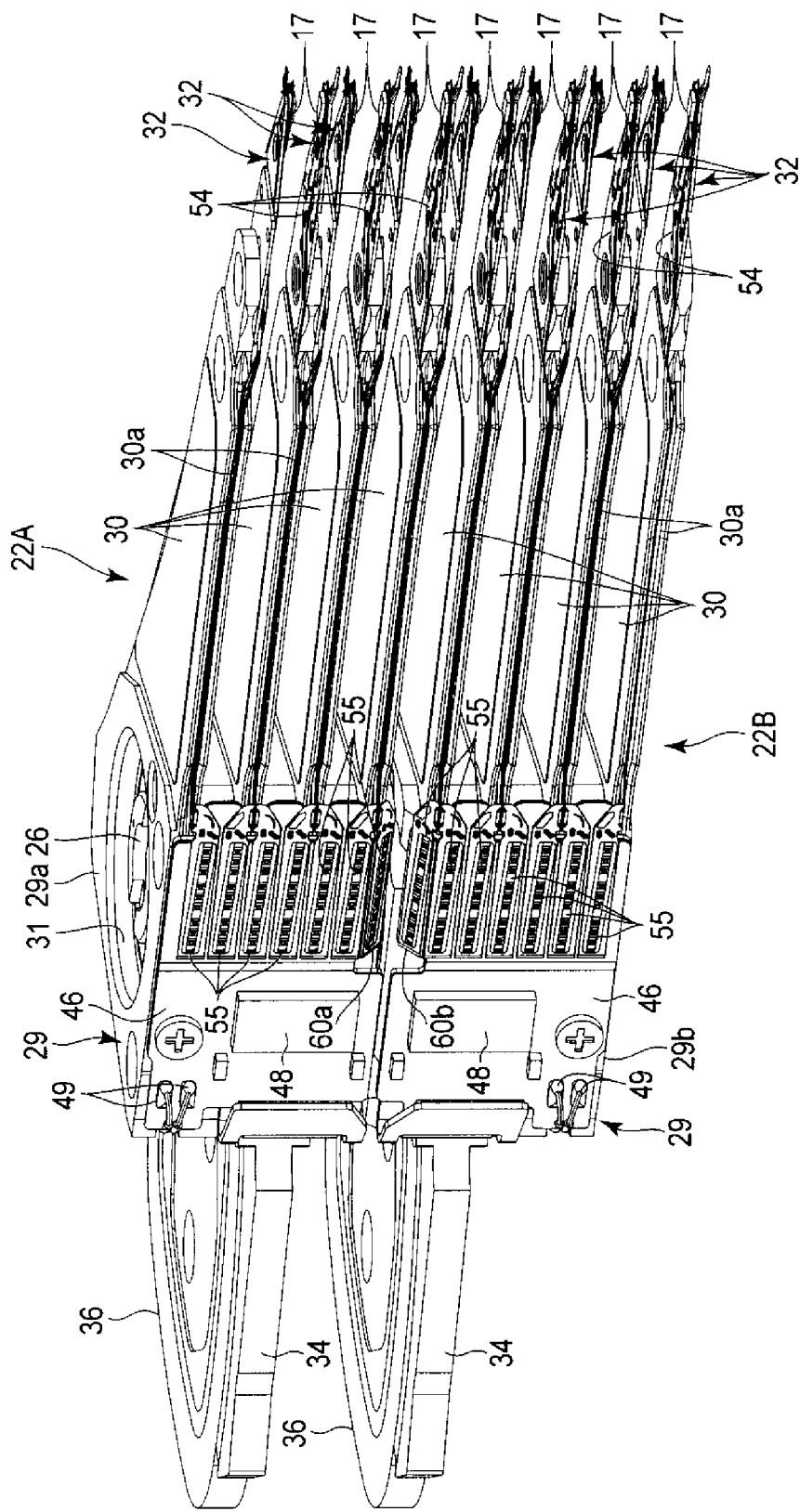
FIG. 10 is a perspective view illustrating actuator assemblies of an HDD according to a second embodiment.
Figure 11:
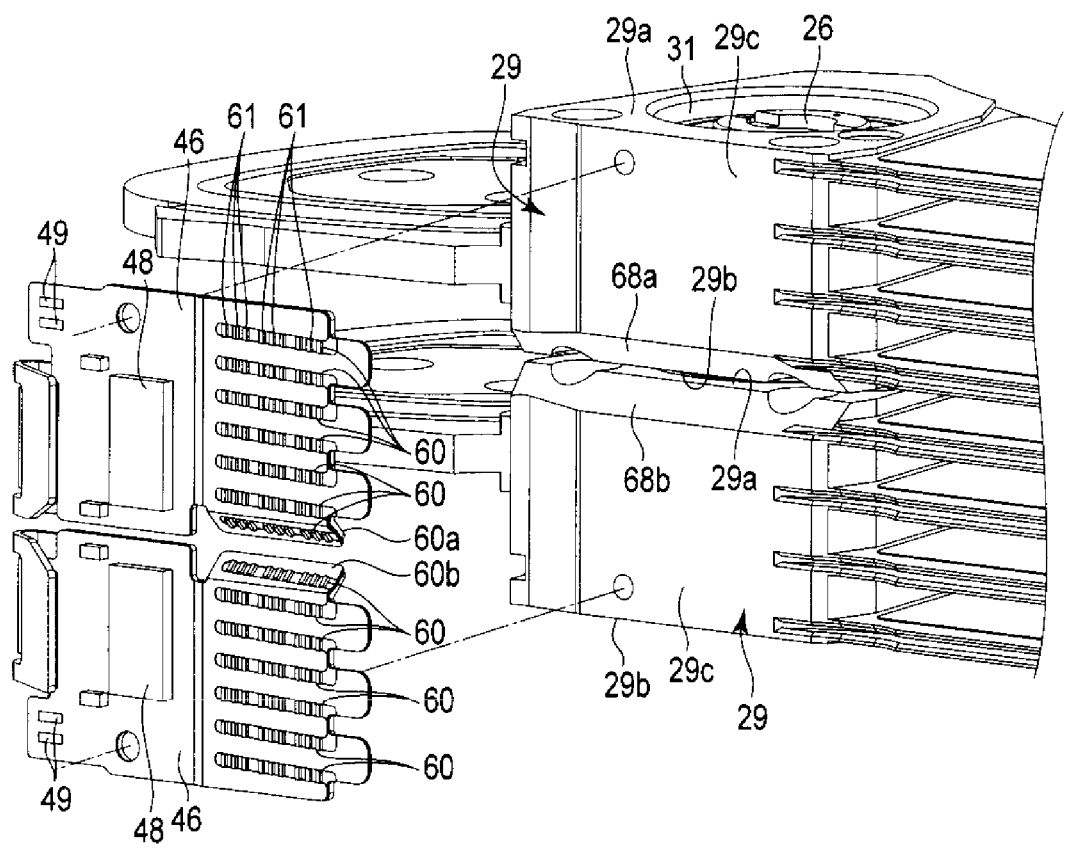
FIG. 11 is an exploded perspective view illustrating actuator blocks of the actuator assemblies and FPC joint portions.
Figure 12:
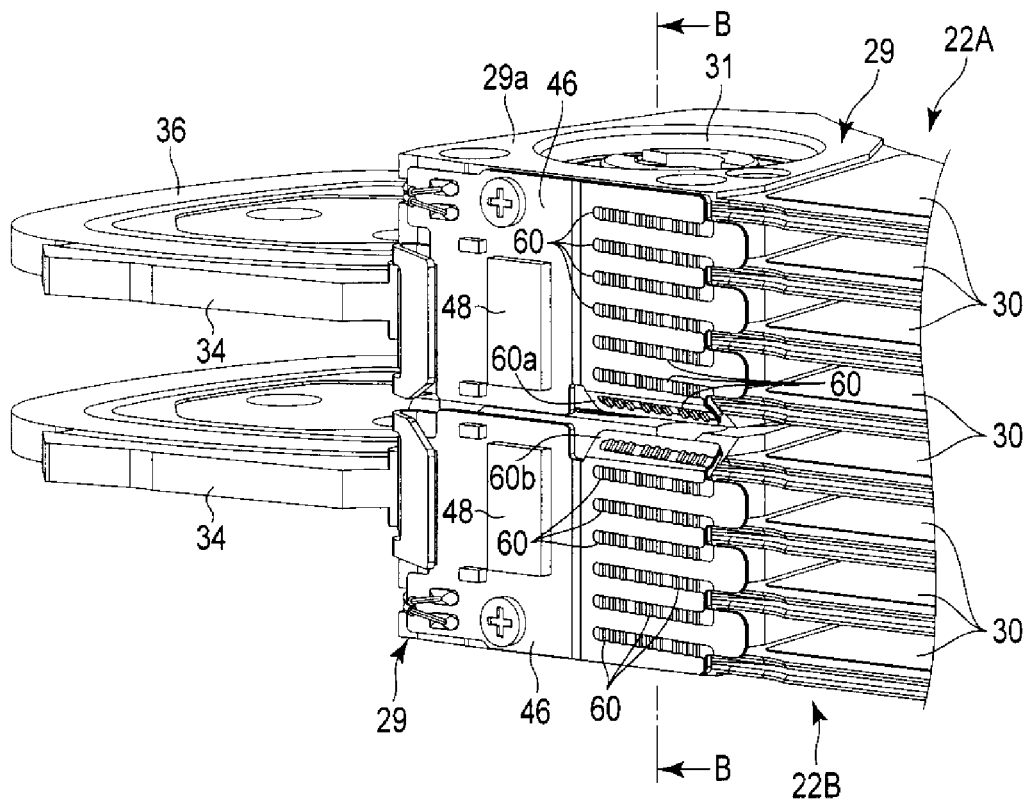
FIG. 12 is a perspective view illustrating actuator block portions of the actuator assemblies in a state in which connection end portions of HGAs are not connected.
Figure 13:
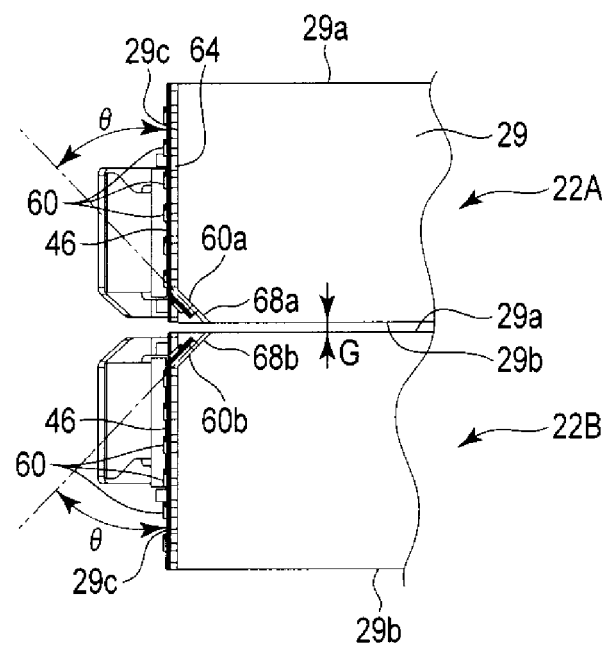
FIG. 13 is a schematic cross-sectional view of the actuator block portions taken along a line B-B of FIG. 12.

FIG. 10 is a perspective view illustrating actuator assemblies of an HDD according to a second embodiment, FIG. 11 is an exploded perspective view illustrating actuator blocks and FPC joint portions of the actuator assemblies, FIG. 12 is a perspective view illustrating the FPC joint portions and the actuator blocks in a state in which connection end portions of the HGAs are not connected, and FIG. 13 is a schematic cross-sectional view of actuator block portions taken along a line B-B of FIG. 12.

According to the second embodiment, the lower end connection portion (first connection portion) 60a and the upper end connection portion (second connection portion) 60b on the FPC joint portions (wiring boards) 46 are bent in an opposite direction to the direction in the first embodiment (direction of approaching the support shaft 26). As shown in FIG. 11, in the first actuator block 29, corner portions where the installation surface 29c intersects the lower end surface 29b are obliquely notched and a lower end portion of the installation surface 29c forms an inclined surface 68a inclined with respect to the installation surface 29c toward the support shaft 26. In the second actuator block 29, corner portions where the installation surface 29c intersects the upper end surface 29a are obliquely notched and an upper end portion of the installation surface 29c forms an inclined surface 68b inclined with respect to the installation surface 29c toward the support shaft 26.

As shown in FIGS. 11 and 13, in the joint portion (first wiring board) 46 of the first actuator assembly 22A, the rectangular lower end connection portion 60a in which the lowermost connection pad group 60 is provided is bent together with a corresponding part of the backing plate 64 toward the first actuator block 29, that is, toward the support shaft 26, compared with other portions on the joint portion 46. The lower end connection portion 60a is inclined at the angle θ (for example, 30 to 70 degrees) with respect to the surface of the joint portion 46. The connection pad group 60 on the lower end connection portion 60a is thereby provided at the angle different from that of the other connection pad groups 60.

In the joint portion (second wiring board) 46 of the second actuator assembly 22B, the upper end connection portion 60b in which the uppermost connection pad group 60 is provided is bent together with a corresponding part of the backing plate 64 toward the second actuator block 29, that is, toward the support shaft 26, compared with other portions on the joint portion 46. The upper end connection portion 60b is inclined at the angle θ (for example, 30 to 70 degrees) with respect to the surface of the joint portion 46. The connection pad group 60 on the upper end connection portion 60a is thereby provided at the angle different from that of the other connection pad groups 60.

As shown in FIGS. 12 and 13, the lower end connection portion 60a is disposed on the inclined surface 68a and the upper end connection portion 60b is disposed on the inclined surface 68b in a state in which the joint portions 46 are fixed to the installation surface 29c of the first actuator block 29 and the installation surface 29c of the second actuator block 29, respectively. The lower end connection portion 60a and the upper end connection portion 60b are disposed to bite into the actuator blocks 29 and opposed to each other with a gap kept therebetween without interference with each other. In this way, the lower end connection portion 60a and the upper end connection portion 60b are bent in a direction of approaching the support shaft 26; thus, even if the gap G between the first and second actuator blocks 29 is set narrow, it is possible to sufficiently secure the spacing between the lower end connection portion 60a and the upper end connection portion 60b.

As shown in FIG. 10, the connection end portions 55 of the plurality of flexures 54 are superimposed on the corresponding connection positions on the joint portions 46. The plurality of connection terminals 58 of the connection portions 55 are electrically and mechanically joined to the corresponding connection pad groups 60 by, for example, soldering. In the first actuator assembly 22A, the lowermost connection end portion 55 is superimposed on the lower end connection portion 60a on the joint portion 46 and joined to the connection pad group 60. The lowermost connection end portion 55 is thereby disposed in a state of being bent from the installation surface 29c toward the support shaft 26 along the lower end connection portion 60a.

In the second actuator assembly 22B, the uppermost connection end portion 55 is superimposed on the upper end connection portion 60b on the joint portion 46 and joined to the connection pad group 60. The uppermost connection end portion 55 is disposed in a state of being bent from the installation surface 29c toward the support shaft 26 along the upper end connection portion 60b.

In the second embodiment, other configurations of the HDD are the same as those of the HDD according to the abovementioned first embodiment.

According to the dual actuator assembly configured as described above, in the boundary portion between the first actuator assembly 22A and the second actuator assembly 22B, the lower end connection portion 60a and the connection end portion 55 are disposed and bent from the installation surface 29c toward the support shaft 26, and the upper end connection portion 60b and the connection end portion 55 are disposed and bent from the installation surface 29c toward the support shaft 26. Owing to this, even if the first actuator block 29 and the second actuator block 29 are disposed close to each other, the sufficient gap can be secured therebetween without interference between the lower end connection portion 60a and the upper end connection portion 60b. It is thereby possible to set narrow the gap G between the first actuator block 29 and the second actuator block 29, and it is unnecessary to extend a stacking spacing between the magnetic disks corresponding to the boundary between the first actuator assembly 22A and the second actuator assembly 22B.

From the above, it is possible to obtain the disk apparatus capable of providing a plurality of actuator assemblies without reducing the memory capacity according to the second embodiment.

While the disk apparatus is configured such that both the lower end connection portion 60a on the FPC joint portion 46 in the first actuator assembly and the upper end connection portion 60b on the FPC joint portion 46 in the second actuator assembly are bent in the second embodiment, the configuration of the disk apparatus is not limited to this configuration. Alternatively, the disk apparatus may be configured such that only one of the lower end connection portion 60a and the upper end connection portion 60b is bent. Even in this alternative, it is possible to set narrow the gap between the actuator blocks.

The present disclosure is not limited to the abovementioned embodiments as they are but the present disclosure can be embodied by modifying the constituent elements without departing from the spirit of the present disclosure in an implementation phase. Furthermore, various inventions can be embodied by combining a plurality of constituent elements disclosed in the embodiments as appropriate. For example, some of the constituent elements may be deleted from all the constituent elements described in the embodiments. Moreover, the constituent elements across the different embodiments may be combined as appropriate.

The number of actuator assemblies is not limited to two such as the first and second actuator assemblies but the disk apparatus may be configured such that three or more actuator assemblies are rotatably supported on a common support shaft. In this case, the disk apparatus may be configured such that the upper end connection portions or the lower end connection portions located near the boundaries between the actuator assemblies adjacent vertically are disposed and bent.

The number of magnetic disks is not limited to seven but may be equal to or lower than six or equal to or higher than eight, and the number of HGAs and the number of magnetic heads may be increased or reduced depending on the number of magnetic disks to be installed. In the connection end portion of each HGA, the number of connection terminals is not limited to nine but may be increased or reduced as needed. Materials, shapes, magnitudes, and the like of the constituent elements of the disk apparatus are not limited to those in the embodiments but can be variously changed as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk apparatus comprising:
   a plurality of recording disks; and
   a first and a second actuator assembly that rotate about
      a support shaft and that each include:
      a rotatable actuator block;
      a wiring board having a plurality of connection terminals and installed on an installation surface of the actuator block; and
      a plurality of head gimbal assemblies each attached to the actuator block via an arm and each including
         a head that reads or writes information from or to a corresponding recording disk of the recording disks, and
         an interconnection member having a tip end portion connected to the head and a connection end portion connected to a corresponding connection terminal of the connection terminals,
   wherein the wiring board of each of the first and the second actuator assembly has a connection portion connected to one of the connection terminals and located adjacently to a boundary between the actuator blocks of the first and the second actuator assembly, and either the connection portion of the first actuator assembly or the connection portion of the second actuator assembly is bent with respect to the installation surface.

2. The disk apparatus according to claim 1, wherein the connection portion is bent with respect to the installation surface in a direction of separating from the support shaft.

3. The disk apparatus according to claim 2, wherein the connection portion is inclined at an angle θ with respect to the installation surface, and the angle θ is between 30 and 80 degrees.

4. The disk apparatus according to claim 1, wherein the connection portion is bent with respect to the installation surface in a direction of approaching the support shaft.

5. The disk apparatus according to claim 4, wherein the installation surface of the actuator block of the first actuator assembly has a first inclined surface inclined in the direction of approaching the support shaft, and the connection portion of the first actuator assembly is bent in the direction of approaching the support shaft along the first inclined surface.

6. The disk apparatus according to claim 5, wherein the installation surface of the actuator block of the second actuator assembly has a second inclined surface inclined in the direction of approaching the support shaft, and the connection portion of the second actuator assembly is bent in the direction of approaching the support shaft along the second inclined surface.

7. The disk apparatus according to claim 6, wherein either or both of the first and the second inclined surface is inclined at an angle θ with respect to the installation surface, and the angle θ is between 30 and 70 degrees.

8. The disk apparatus according to claim 1, further comprising a first and a second voice coil motor that independently drive the first and the second actuator assembly, respectively.

9. The disk apparatus according to claim 8, wherein there is a gap between the connection portion of the first actuator assembly and the connection portion of the second actuator assembly that are opposed to each other.

10. The disk apparatus according to claim 1, wherein the installation surface of each of the first and the second actuator assembly extends in parallel to the support shaft.

11. A dual actuator assembly for reading or writing information from or to a plurality of recording disks, the dual actuator assembly comprising:

a first and a second actuator assembly that rotate about a support shaft and that each include:

a rotatable actuator block;

a wiring board having a plurality of connection terminals and installed on an installation surface of the actuator block; and a plurality of head gimbal assemblies each attached to the actuator block via an arm and each including a head that reads or writes information from or to a corresponding recording disk of the recording disks, and an interconnection member having a tip end portion connected to the head and a connection end portion connected to a corresponding connection terminal of the connection terminals, wherein the wiring board of each of the first and the second actuator assembly has a connection portion connected to one of the connection terminals and located adjacently to a boundary between the actuator blocks of the first and the second actuator assembly, and either the connection portion of the first actuator assembly or the connection portion of the second actuator assembly is bent with respect to the installation surface.

12. The dual actuator assembly according to claim 11, wherein the connection portion is bent with respect to the installation surface in a direction of separating from the support shaft.

13. The dual actuator assembly according to claim 12, wherein the connection portion is inclined at an angle θ with respect to the installation surface, and the angle θ is between 30 and 80 degrees.

14. The dual actuator assembly according to claim 11, wherein the connection portion is bent with respect to the installation surface in a direction of approaching the support shaft.

15. The dual actuator assembly according to claim 14, wherein the installation surface of the actuator block of the first actuator assembly has a first inclined surface inclined in the direction of approaching the support shaft, and the connection portion of the first actuator assembly is bent in the direction of approaching the support shaft along the first inclined surface.

16. The dual actuator assembly according to claim 15, wherein the installation surface of the actuator block of the second actuator assembly has a second inclined surface inclined in the direction of approaching the support shaft, and the connection portion of the second actuator assembly is bent in the direction of approaching the support shaft along the second inclined surface.

17. The dual actuator assembly according to claim 16, wherein either or both of the first and the second inclined surface is inclined at an angle θ with respect to the installation surface, and the angle θ is between 30 and 70 degrees.

18. The dual actuator assembly according to claim 11, further comprising a first and a second voice coil motor that independently drive the first and the second actuator assembly, respectively.

19. The dual actuator assembly according to claim 18, wherein there is a gap between the connection portion of the first actuator assembly and the connection portion of the second actuator assembly that are opposed to each other.

20. The dual actuator assembly according to claim 11, wherein
the installation surface of each of the first and the second actuator assembly extends in parallel to the support shaft.

* * * * *